A. U. BRIGGS.
RECIPROCATING SAW MACHINE.
APPLICATION FILED NOV. 10, 1916.
1,230,991.
Patented June 26, 1917.
2 SHEETS—SHEET 1.
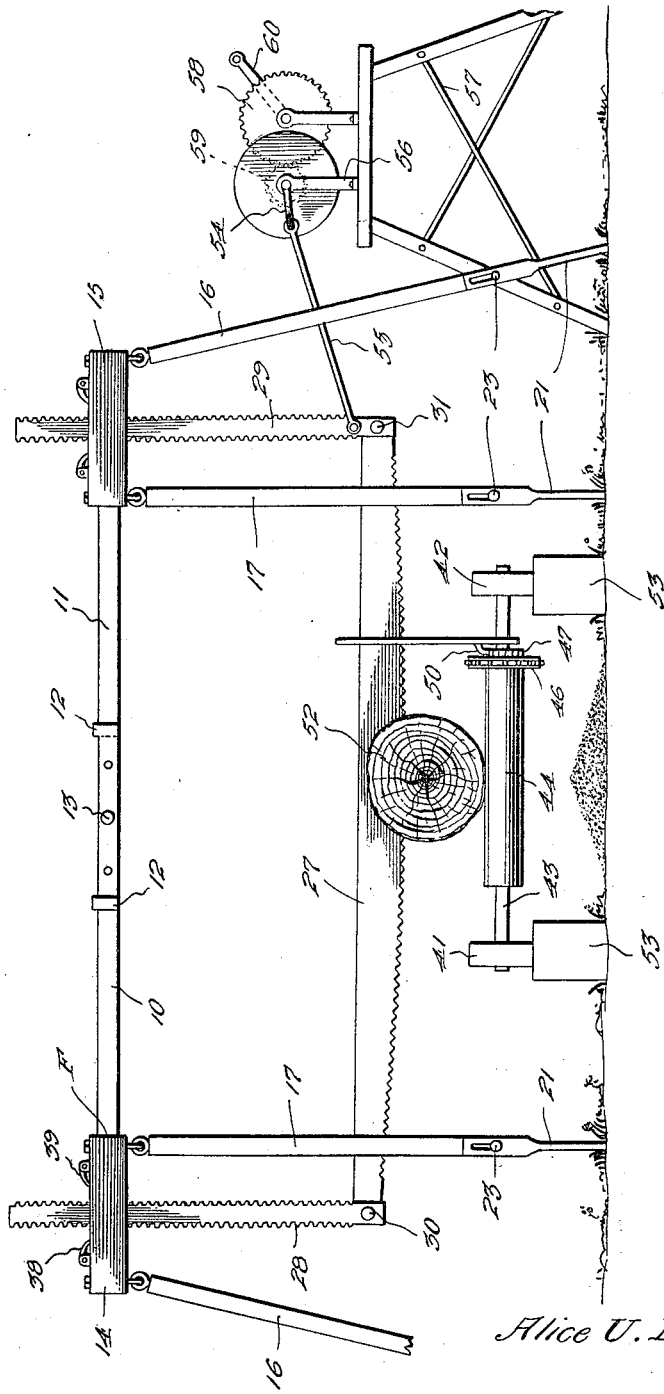
Alice U. Briggs.
Inventor
By Geo. P. Kimmel
Attorney

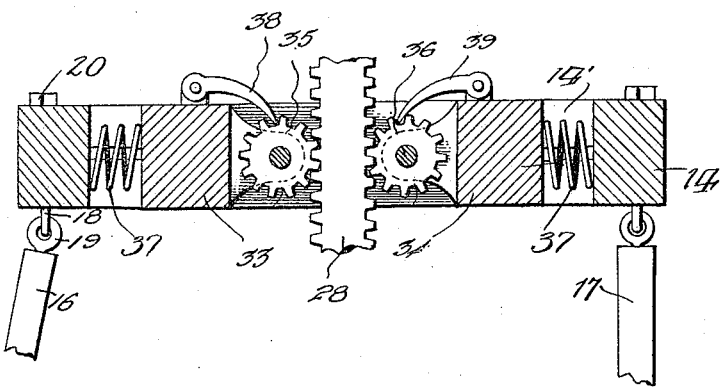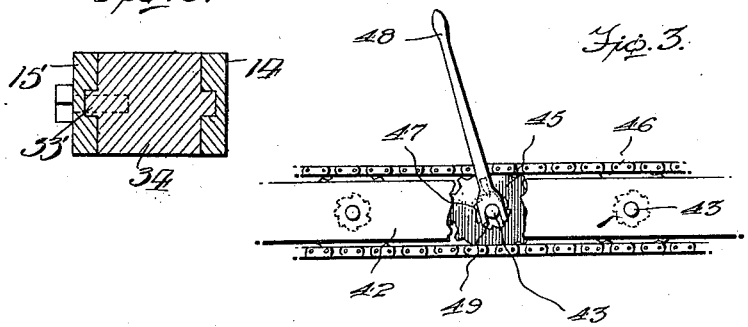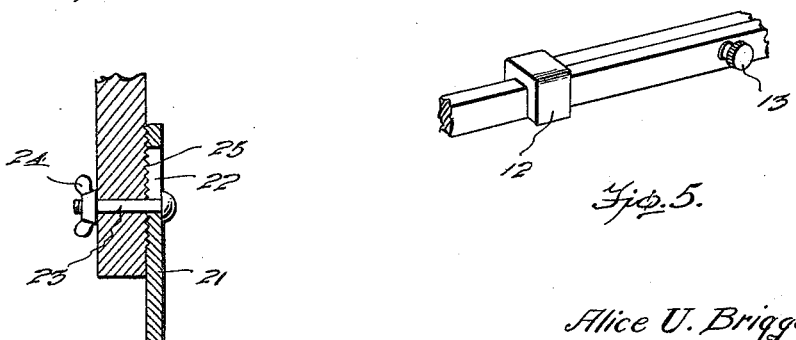

UNITED STATES PATENT OFFICE.

ALICE U. BRIGGS, OF UNION CITY, PENNSYLVANIA.

RECIPROCATING-SAW MACHINE.

1,230,991.

Specification of Letters Patent.

Patented June 26, 1917.

Application filed November 10, 1916. Serial No. 130,610.

*To all whom it may concern:*

Be it known that I, ALICE U. BRIGGS, a citizen of the United States, and resident of Union City, in the county of Erie and State of Pennsylvania, have invented certain new and useful Improvements in Reciprocating-Saw Machines, of which the following is a specification.

The present invention relates to wood sawing and has particular reference to new and useful improvements in automatic feed reciprocating saws.

My invention contemplates the provision of a novel and improved sawing machine of the reciprocating type wherein automatic means is provided to feed the saw upon each reciprocation thereof and thereby afford a more accurate cut, enhance the efficiency of such saws, and lighten the work of an attendant.

My invention also contemplates the provision of a sawing machine of the class referred to which is portable, the various parts thereof being readily disassembled to be transported from place to place.

My invention further contemplates the provision of a simple and effective work feeder for use in conjunction with the saw of my invention.

A still further object of my invention is to provide a saw of the class referred to which is simple in construction, strong and durable, cheap to manufacture and effective in operation.

Other objects and advantages to be derived from the use of my improved automatic feed reciprocating saw will appear from the following detailed description and the claims, taken with an inspection of the accompanying drawings, in which:

Figure 1 is a side elevational view of a saw machine embodying the improvements of my invention;

Fig. 2 is an enlarged sectional view of the automatic feed for the saw;

Fig. 3 is a fragmental side elevational view of a portion of the work feeder;

Fig. 4 is an enlarged sectional view of one of the adjustable supporting legs; and Fig. 5 is an enlarged fragmental perspective view of a portion of the adjustable supporting frame.

Fig. 6 is a cross-section through one of the blocks.

Referring more particularly to the drawings, wherein similar characters of reference designate like and corresponding parts throughout the various views, I provide a supporting frame composed of bars 10 and 11, the free ends of said bars being formed with U-shaped portions 12 to overlap the adjoining portion of the adjacent bar, a locking screw 13 having a knurled head passing through the bars and retaining the same in adjusted positions.

A pair of saw carrying bearing members are provided designated 14 and 15, said bearing members being carried by the free ends of the bars 10 and 11. Referring specifically to Fig. 2 wherein one of the bearings is best shown it will be seen that the bearing member is provided with a recess 14' one side 15' of the member being removable.

Each of the members 14 and 15 is supported on legs 16 and 17 termed outer and inner legs, respectively. The outer legs 16 are preferably inclined to brace the blocks, said legs 16 being arranged in pairs on each of the members and divergently related. The legs 17 may be vertical, if desired. Said legs 16 and 17 are connected to the bearing members by means of bolts 18, said bolts having portions to engage the eyes 19 carried by said legs, said bolts passing through said members and being secured therein by means of nuts 20. The lower ends of the legs 16 and 17 are provided with extension members 21, best shown in Fig. 4, the extension member being provided with an elongated opening 22 through which a fastening bolt 23 is adapted to pass, said bolt being carried by the lower end of the legs. A wing nut 24 is mounted on the free end of the bolt.

The inner surface of the extensions 21 is provided with teeth 25 to engage the adjacent surface of the leg. The saw is designated 27 and may comprise a blade having the usual arrangement of cutting teeth thereon. A pair of double rack bars 28 and 29 are connected at 31 and 31 with the saw 27, said rack bars serving to coact with the bearing members 14 and 15 to support the saw in use.

In view of the fact that both of the bearing members are identical in construction I shall describe the feeding mechanism of but one of the same. Referring specifically to Fig. 2 wherein the feeding mechanism of one of the bearing members is best shown, I have provided a pair of blocks 33 and 34 slidably mounted in the recess 14', said blocks being maintained against displacement by means of flanges 13' engaging in complemental grooves formed in the sides of the bearing members. The bearing blocks 33 and 34 carry pinions 35 and 36 arranged in meshing engagement with the double rack bar 28. Coil springs 37 are arranged between the blocks 33 and 34 and the end portion of the bearing member, so as to maintain the pinions in meshing engagement with the rack bar. A pair of pawls 38 and 39 are pivoted on the blocks 33 and 34, respectively, said pawls engaging with the teeth of the pinions 35 and 36. The purpose of the arrangement of the blocks 33 and 34 slidably is to permit of movement of said blocks at the start of operation of the saw so as not to fracture the teeth of the rack bar or pinions or place undue strain upon the same. Of course, the springs 37 are of such strength as to maintain the blocks practically rigid except when undue strain is placed thereupon.

The conveyer for feeding the work to the saw includes a pair of stringers 41 and 42 carrying a plurality of shafts 43 on which are mounted rollers 44. Each of the rollers may be provided with a sprocket wheel, said sprocket wheels being designated 45. A sprocket chain 46 is trained over the sprocket wheels 45 so that all of the rollers may be caused to simultaneously move. Each of the shafts 43 may be provided with a ratchet wheel designated 47, or each alternate shaft may be provided with said ratchet wheels as desired. A lever 48 having a U-shaped end 49 to engage one of the shafts 43 is provided for moving the work conveyer, said lever having an offset lug 50 thereon to engage the ratchet wheel.

In Fig. 1 a log 52 is shown in course of cutting. The stringers 41 and 42 may be mounted on any suitable foundation, said foundation being designated 53.

Motion is imparted to the saw by means of a driving wheel 54, said wheel being connected to the saw by means of a connecting rod 55. The wheel 54 is mounted in a bearing 56, carried by a supporting frame 57. A gear 58 meshes with a pinion 59 carried on the same shaft with the wheel 54, a crank 60 being associated with said gear 58 to drive the same. Of course, if desired, an electric motor or a steam engine, or any suitable source of power may be employed in lieu of the manual driving mechanism shown.

In operation, when motion is imparted to the saw blade the same will be caused to reciprocate, this imparting a rocking motion to the double rack bars 28 and 29 owing to the mounting of said rack bars between the pinions. It will be seen that when the rack bars are oscillated one of a set of the pinions will act as a fulcrum, the bar moving relative to the other pinion. This will cause a partial rotation of the free pinion and upon an oscillation of the bar in the opposite direction a similar action will take place with the other pinion. In this manner the rack bar will be moved downwardly step-by-step as the saw performs the cutting operation, the saw naturally tending to descend by gravity.

Thus it will be seen that in the provision of my improved sawing machine an automatic feed for the saw is provided, this feed being entirely automatic; not requiring the attention of an operator other than to feed the work to the saw and to raise the saw after a cutting operation has been completed. The degree to which the saw is fed at each oscillation depends entirely upon the stroke and it will thus be seen that where a long stroke is employed a more rapid feed will be afforded owing to the fact that the feed depends upon the length of stroke of the saw. The device is portable, the various parts thereof being readily detachable for transporting from place to place.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. In a sawing machine, the combination with an adjustable frame having bearing members and supporting legs, of a saw blade, suspending rack bars therefor passing through said bearings, pinions slidably mounted in the bearings and engaging said rack bars, pawl members carried by the bearings to prevent reversal of said pinions, reciprocation of said saw causing oscillation of said rack bars between the pinions to feed the saw to the work.

2. In a sawing machine, the combination with an adjustable frame having bearing members and supporting legs, of a reciprocable saw blade, suspending rack bars therefor passing through said bearings and having their lower ends engaging the opposite ends of the saw blade, a supplemental frame slidably mounted in each of said bearings, pinions carried by the supplemental frame and engaging said rack bars, and means to prevent the rotation of the pinions in one direction but to permit rotation of the same in the other direction, whereby upon a reciprocation of the saw and an oscillation of said bars the saw will be fed to the work.

3. In a sawing machine, the combination with an adjustable frame having substantially rectangular shaped bearing members, of a reciprocable saw blade, suspending rack bars therefor passing through said bearings and having their lower ends engaging the opposite ends of the saw blade, a supplemental frame slidably mounted between the sides of each bearing, spring means to normally position said supplemental frame intermediate the ends of each bearing, pinions carried by the supplemental frame and engaging said rack bars, and means to prevent rotation of the pinions in one direction but to permit rotation of the same in the other direction, whereby upon a reciprocation of the saw and an oscillation of said bars the saw will be fed to the work.

4. In a sawing machine, the combination of a supporting frame having bearing members on the free ends thereof, supporting legs for said bearing members, said legs being pivotally connected with said bearing members, a reciprocable saw blade, supporting rack bars for said blade, said rack bars extending through said bearing members, a plurality of pinions slidably mounted in the bearings to engage said rack bars, means to prevent rotation of the pinions in one direction but permit rotation of the same in an opposite direction, whereby upon a reciprocation of the saw and an oscillation of said bars the saw will be fed to the work.

5. In a sawing machine, the combination with a reciprocable saw, supporting rack bars for said saw engaging the same, of a frame comprising a pair of bearing members disposed in a single horizontal plane and adapted to receive the rack bars therethrough whereby upon a reciprocation of the saw and an oscillation of said bars the saw will be fed to the work, a longitudinally adjustable horizontally disposed connection between said bearings, pivotally mounted supporting legs for said bearings, said legs being vertically adjustable.

In testimony whereof, I affix my signature hereto.

Mrs. ALICE U. BRIGGS.

Copies of this patent may be obtained for five cents each, by addressing the "Commissioner of Patents, Washington, D. C."